(12) United States Patent
Everett et al.

(10) Patent No.: US 6,742,715 B2
(45) Date of Patent: Jun. 1, 2004

(54) SYSTEM AND METHOD FOR FLEXIBLY LOADING AN IC CARD

(75) Inventors: David Barrington Everett, East Sussex (GB); Stuart James Miller, Berks (GB); Anthony David Peacham, Kent (GB); Ian Stephen Simmons, Cambs (GB); Timothy Philip Richards, Herts (GB); John Charles Viner, Windlesham (GB)

(73) Assignee: Mondex International Limited, London (GB)

( * ) Notice: Subject to any disclaimer, the term of this patent is extended or adjusted under 35 U.S.C. 154(b) by 0 days.

(21) Appl. No.: 10/260,858

(22) Filed: Sep. 30, 2002

(65) Prior Publication Data

US 2003/0024980 A1 Feb. 6, 2003

Related U.S. Application Data

(63) Continuation of application No. 09/076,550, filed on May 12, 1998, now Pat. No. 6,488,211.
(60) Provisional application No. 60/046,514, filed on May 15, 1997.

(51) Int. Cl.[7] ............................................. G06K 19/06
(52) U.S. Cl. ............................................................ 235/492
(58) Field of Search ................................. 235/380, 492

(56) References Cited

U.S. PATENT DOCUMENTS

| | | | |
|---|---|---|---|
| 4,214,230 A | 7/1980 | Fak et al. | 235/380 |
| 4,218,582 A | 8/1980 | Hellman et al. | 380/30 |
| 4,259,720 A | 3/1981 | Campbell | 705/71 |
| 4,302,810 A | 11/1981 | Bouricius et al. | 705/75 |
| 4,305,059 A | 12/1981 | Benton | 705/43 |
| 4,321,672 A | 3/1982 | Braun et al. | 705/42 |
| 4,341,951 A | 7/1982 | Benton | 705/41 |
| 4,405,829 A | 9/1983 | Rivest et al. | 380/30 |
| 4,408,203 A | 10/1983 | Campbell | 705/71 |
| 4,423,287 A | 12/1983 | Zeidler | 705/71 |
| 4,442,345 A | 4/1984 | Mollier et al. | 235/380 |
| 4,453,074 A | 6/1984 | Weinstein | 705/66 |
| 4,467,139 A | 8/1984 | Mollier | 713/181 |

(List continued on next page.)

FOREIGN PATENT DOCUMENTS

| | | | |
|---|---|---|---|
| EP | 0152024 | 8/1985 | G07F/7/10 |
| EP | 0157303 | 10/1985 | G06F/1/00 |

(List continued on next page.)

OTHER PUBLICATIONS

W. Rankl and W. Effing, 1997, "Smart Card Handbook" *John Wiley & Sons Publishing* pp. 107–190.

J. Zoreda and J. Oton, "Smart Cards," 1994, pp. 119, 120, 131, 132.

(List continued on next page.)

*Primary Examiner*—Mark Tremblay
(74) *Attorney, Agent, or Firm*—Baker Botts L.L.P.

(57) ABSTRACT

A system and method of flexibly loading an application and its associated data from an application provider onto an IC card. The application and its associated data is divided into segments which can each fit into the input buffer of an Integrated circuit card. Each segment is transmitted separately and the Integrated circuit card then stores the segment in an available space in the IC card's memory. The segments can be placed in non-contiguous memory in order to reduce memory fragmentation.

2 Claims, 6 Drawing Sheets

U.S. PATENT DOCUMENTS

| | | | |
|---|---|---|---|
| 4,498,000 A | 2/1985 | Decavele et al. | 235/380 |
| 4,536,647 A | 8/1985 | Atalla et al. | 705/70 |
| 4,578,530 A | 3/1986 | Zeidler | 705/71 |
| 4,605,820 A | 8/1986 | Campbell, Jr. | 705/71 |
| 4,629,872 A | 12/1986 | Hallberg | 235/380 |
| 4,630,201 A | 12/1986 | White | 705/44 |
| 4,650,978 A | 3/1987 | Hudson et al. | 235/380 |
| 4,669,596 A | 6/1987 | Capers et al. | 194/210 |
| 4,705,211 A | 11/1987 | Honda et al. | 235/380 |
| 4,709,136 A | 11/1987 | Watanabe | 235/379 |
| 4,709,137 A | 11/1987 | Yoshida | 705/41 |
| 4,727,243 A | 2/1988 | Savar | 705/17 |
| 4,727,244 A | 2/1988 | Nakano et al. | 235/380 |
| 4,731,842 A | 3/1988 | Smith | 705/71 |
| 4,734,568 A | 3/1988 | Watanabe | 235/487 |
| 4,736,094 A | 4/1988 | Yoshida | 705/41 |
| 4,742,215 A | 5/1988 | Daughters et al. | 235/487 |
| 4,745,267 A | 5/1988 | Davis et al. | 235/379 |
| 4,746,788 A | 5/1988 | Kawana | 235/380 |
| 4,748,320 A | 5/1988 | Yorimoto et al. | 235/492 |
| 4,748,557 A | 5/1988 | Tamada et al. | 235/379 |
| 4,748,668 A | 5/1988 | Shamir et al. | 380/30 |
| 4,752,677 A | 6/1988 | Nakano et al. | 235/380 |
| 4,757,185 A | 7/1988 | Onishi | 235/379 |
| 4,757,543 A | 7/1988 | Tamada et al. | 380/51 |
| 4,759,063 A | 7/1988 | Chaum | 380/30 |
| 4,759,064 A | 7/1988 | Chaum | 380/30 |
| 4,767,920 A | 8/1988 | Kitta et al. | 235/492 |
| 4,778,983 A | 10/1988 | Ushikubo | 235/381 |
| 4,785,166 A | 11/1988 | Kushima | 235/441 |
| 4,786,790 A | 11/1988 | Kruse et al. | 235/380 |
| 4,797,542 A | 1/1989 | Hara | 235/380 |
| 4,797,920 A | 1/1989 | Stein | 705/72 |
| 4,798,941 A | 1/1989 | Watanabe | 235/380 |
| 4,802,218 A | 1/1989 | Wright et al. | 705/60 |
| 4,803,347 A | 2/1989 | Sugahara et al. | 235/379 |
| 4,811,393 A | 3/1989 | Hazard | 380/277 |
| 4,816,653 A | 3/1989 | Anderl et al. | 235/380 |
| 4,816,654 A | 3/1989 | Anderl et al. | 235/380 |
| 4,825,052 A | 4/1989 | Chemin et al. | 235/380 |
| 4,831,245 A | 5/1989 | Ogasawara | 235/492 |
| 4,833,595 A | 5/1989 | Iijima | 711/170 |
| 4,839,504 A | 6/1989 | Nakano | 235/379 |
| 4,839,792 A | 6/1989 | Iijima | 235/380 |
| 4,849,614 A | 7/1989 | Watanabe et al. | 235/379 |
| 4,853,522 A | 8/1989 | Ogasawara | 235/380 |
| 4,853,961 A | 8/1989 | Pastor | 713/176 |
| 4,874,935 A | 10/1989 | Younger | 235/492 |
| 4,877,945 A | 10/1989 | Fujisaki | 235/379 |
| 4,877,947 A | 10/1989 | Mori | 235/380 |
| 4,879,747 A | 11/1989 | Leighton et al. | 713/186 |
| 4,882,474 A | 11/1989 | Anderl et al. | 235/380 |
| 4,887,234 A | 12/1989 | Iijima | 711/173 |
| 4,891,503 A | 1/1990 | Jewell | 235/380 |
| 4,891,506 A | 1/1990 | Yoshimatsu | 235/492 |
| 4,900,904 A | 2/1990 | Wright et al. | 235/380 |
| 4,901,276 A | 2/1990 | Iijima | 710/33 |
| 4,906,838 A | 3/1990 | Sogabe et al. | 250/231.14 |
| 4,907,270 A | 3/1990 | Hazard | 713/181 |
| 4,926,480 A | 5/1990 | Chaum | 705/69 |
| 4,935,962 A | 6/1990 | Austin | 713/159 |
| 4,949,257 A | 8/1990 | Orbach | 705/21 |
| 4,961,142 A | 10/1990 | Elliott et al. | 705/73 |
| 4,969,188 A | 11/1990 | Schöbi | 380/277 |
| 4,977,595 A | 12/1990 | Ohta et al. | 705/69 |
| 4,984,270 A | 1/1991 | LaBounty | 705/72 |
| 4,985,615 A | 1/1991 | Iijima | 235/492 |
| 4,987,593 A | 1/1991 | Chaum | 705/69 |
| 4,993,068 A | 2/1991 | Piosenka et al. | 713/186 |
| 4,995,081 A | 2/1991 | Leighton et al. | 713/186 |
| 4,996,711 A | 2/1991 | Chaum | 380/30 |
| 5,001,753 A | 3/1991 | Davio et al. | 380/29 |
| 5,003,594 A | 3/1991 | Shinagawa | 713/159 |
| 5,005,200 A | 4/1991 | Fischer | 380/30 |
| 5,010,239 A | 4/1991 | Mita | 235/441 |
| 5,012,074 A | 4/1991 | Masada | 235/379 |
| 5,012,076 A | 4/1991 | Yoshida | 235/379 |
| 5,014,312 A | 5/1991 | Lisimaque et al. | 705/66 |
| 5,016,274 A | 5/1991 | Micali et al. | 705/66 |
| 5,038,025 A | 8/1991 | Kodera | 235/492 |
| 5,068,894 A | 11/1991 | Hoppe | 713/172 |
| 5,093,862 A | 3/1992 | Scwartz | 705/65 |
| 5,097,115 A | 3/1992 | Ogasawara et al. | 235/380 |
| 5,120,939 A | 6/1992 | Claus et al. | 235/382 |
| 5,128,997 A | 7/1992 | Pailles et al. | 705/66 |
| 5,131,038 A | 7/1992 | Puhl et al. | 340/5.61 |
| 5,142,578 A | 8/1992 | Matyas et al. | 380/280 |
| 5,146,499 A | 9/1992 | Geffrotin | 713/172 |
| 5,148,481 A | 9/1992 | Abraham et al. | 380/46 |
| 5,161,231 A | 11/1992 | Iijima | 710/15 |
| 5,162,989 A | 11/1992 | Matsuda | 705/51 |
| 5,163,098 A | 11/1992 | Dahbura | 705/75 |
| 5,164,988 A | 11/1992 | Matyas et al. | 713/156 |
| 5,165,043 A | 11/1992 | Miyahara et al. | 235/380 |
| 5,166,503 A | 11/1992 | Mizuta | 235/492 |
| 5,175,416 A | 12/1992 | Mansvelt et al. | 235/379 |
| 5,180,901 A | 1/1993 | Hiramatsu | 235/380 |
| 5,191,193 A | 3/1993 | Le Roux | 235/379 |
| 5,191,608 A | 3/1993 | Geronimi | 713/187 |
| 5,200,999 A | 4/1993 | Matyas et al. | 380/277 |
| 5,201,000 A | 4/1993 | Matyas et al. | 380/30 |
| 5,202,922 A | 4/1993 | Iijima | 380/45 |
| 5,214,702 A | 5/1993 | Fischer | 380/30 |
| 5,224,162 A | 6/1993 | Okamoto et al. | 705/69 |
| 5,243,175 A | 9/1993 | Kato | 235/435 |
| 5,247,578 A | 9/1993 | Pailles et al. | 705/65 |
| 5,293,577 A | 3/1994 | Hueske et al. | 705/65 |
| 5,371,797 A | 12/1994 | Bocinsky, Jr. | 705/70 |
| 5,375,233 A | 12/1994 | Kimber et al. | 707/205 |
| 5,420,405 A | 5/1995 | Chasek | 235/379 |
| 5,452,431 A | 9/1995 | Bournas | 711/115 |
| 5,473,690 A | 12/1995 | Grimonprez et al. | 705/66 |
| 5,485,520 A | 1/1996 | Chaum et al. | 705/74 |
| 5,511,121 A | 4/1996 | Yacobi | 705/69 |
| 5,517,011 A | 5/1996 | Vandenengel | 235/441 |
| 5,530,232 A | 6/1996 | Taylor | 235/380 |
| 5,534,857 A | 7/1996 | Laing et al. | 340/5.74 |
| 5,539,825 A | 7/1996 | Akiyama et al. | 705/68 |
| 5,542,081 A | 7/1996 | Geronimi | 712/37 |
| 5,544,246 A | 8/1996 | Mandelbaum et al. | 705/65 |
| 5,546,523 A | 8/1996 | Gatto | 345/811 |
| 5,557,516 A | 9/1996 | Hogan | 705/41 |
| 5,568,634 A | 10/1996 | Gordons | 711/170 |
| 5,574,269 A | 11/1996 | Mori et al. | 235/380 |
| 5,578,808 A | 11/1996 | Taylor | 235/380 |
| 5,581,708 A | 12/1996 | Iijima | 710/11 |
| 5,588,146 A | 12/1996 | Leroux | 707/1 |
| 5,664,157 A | 9/1997 | Takahira et al. | 703/23 |
| 5,682,027 A | 10/1997 | Bertina et al. | 235/380 |
| 5,692,132 A | 11/1997 | Hogan | 705/27 |
| 5,699,528 A | 12/1997 | Hogan | 705/40 |
| 5,704,046 A | 12/1997 | Hogan | 705/39 |
| 5,705,798 A | 1/1998 | Tarbox | 235/379 |
| 5,708,780 A | 1/1998 | Levergood et al. | 709/229 |
| 5,715,314 A | 2/1998 | Payne et al. | 705/78 |
| 5,724,424 A | 3/1998 | Gifford | 705/79 |
| 5,796,831 A | 8/1998 | Paradinas et al. | 705/68 |
| 5,825,875 A | 10/1998 | Ugon | 705/65 |
| 5,923,884 A * | 7/1999 | Peyret et al. | 717/167 |

FOREIGN PATENT DOCUMENTS

| | | | |
|---|---|---|---|
| EP | 0190733 | 8/1986 | ............. G07F/7/10 |
| EP | 0218176 | 4/1987 | ............. G07F/7/10 |
| EP | 0292248 A | 1/1988 | ............. G07F/7/10 |
| EP | 0261030 | 3/1988 | ............. G06F/1/00 |
| EP | 0275510 | 7/1988 | ............. G07F/7/10 |
| EP | 0325506 | 7/1989 | ............. G07F/7/10 |
| EP | 0328289 | 8/1989 | ............. G07F/7/10 |
| EP | 0354793 | 2/1990 | ......... G06K/19/073 |
| EP | 0451936 | 10/1991 | ............. G06K/1/00 |
| EP | 0466969 | 1/1992 | ............. G07F/7/10 |
| EP | 0475837 | 3/1992 | ............. G07F/7/10 |
| EP | 0537756 | 4/1993 | ............. H04B/7/00 |
| EP | 0540095 | 5/1993 | ......... G06K/19/073 |
| EP | 0547741 | 6/1993 | ............. G06F/12/14 |
| EP | 0559205 | 9/1993 | ......... G06K/19/06 |
| EP | 0588339 | 3/1994 | ............. G07F/7/10 |
| EP | 0594493 | 4/1994 | ............. G06G/1/00 |
| EP | 0636998 | 2/1995 | .......... G06K/19/07 |
| EP | 0647902 | 4/1995 | ............. G06F/9/46 |
| EP | 0666550 | 8/1995 | ............. G07F/7/10 |
| EP | 0686947 | 12/1995 | ............. G07F/7/08 |
| EP | 0707290 | 4/1996 | ............. G07F/7/10 |
| EP | 0751460 | 1/1997 | ............. G06F/9/46 |
| FR | 2536928 | 6/1984 | ............. H04L/9/00 |
| FR | 2667171 | 3/1992 | ............. G06F/9/06 |
| FR | 2687816 | 8/1993 | ......... G06K/19/073 |
| GB | 2284689 | 6/1995 | ............. G06F/9/24 |
| JP | 6481084 | 3/1989 | |
| JP | 2592856 | 12/1996 | |
| WO | 8707062 | 6/1984 | ............. G07F/7/10 |
| WO | 8707061 A | 11/1987 | ............. G07F/7/10 |
| WO | 8809019 | 11/1988 | ............. G06K/5/00 |
| WO | 9005960 | 5/1990 | ............. G06K/1/12 |
| WO | 9101538 | 2/1991 | ........... G07F/17/42 |
| WO | 9116691 | 10/1991 | ............. G07F/7/10 |
| WO | 9213322 | 8/1992 | ............. G07F/7/10 |
| WO | 9320538 | 10/1993 | ......... G06K/19/073 |
| WO | 9321612 | 10/1993 | ............. G07F/17/16 |
| WO | 9522810 | 8/1995 | ............. G07G/7/12 |
| WO | 9619771 | 6/1996 | .......... G06G/12/00 |
| WO | 9628795 | 9/1996 | ............. G07F/7/10 |
| WO | 9638825 | 12/1996 | ............. G07F/7/10 |
| WO | 9843212 | 10/1998 | ............. G07F/7/10 |
| WO | 9910824 | 3/1999 | ........... G06F/17/60 |
| WO | 9916031 | 4/1999 | ............. G07F/7/10 |

OTHER PUBLICATIONS

Davies et al., "Security for Computer Networks: An Introduction to Data Security in Teleprocessing and Electronic Funds Transfer," John Wiley & Sons, 1984.

* cited by examiner

SYSTEM AND METHOD FOR FLEXIBLY LOADING AN IC CARD

CROSS-REFERENCE TO RELATED APPLICATIONS

This application is a continuation of U.S. patent application Ser. No. 09/076,550 filed on May 12, 1998, now U.S. Pat. No. 6,488,211 and entitled "System and Method for Flexibly Loading an IC Card," which is incorporated herein by reference and which claims priority to United States Provisional application 60/046,514 filed on May 15, 1997, and entitled "Design for Multi Application Smart Card," which is incorporated herein by reference.

BACKGROUND OF INVENTION

Integrated circuit ("IC") cards are becoming increasingly used for many different purposes in the world today. An IC card (also called a smart card) typically is the size of a conventional credit card which contains a computer chip including a microprocessor, read-only memory (ROM), electrically erasable programmable read-only-memory (EEPROM), an Input/Output (I/O) mechanism and other circuitry to support the microprocessor in its operations. An IC card may contain a single application or may contain multiple independent applications in its memory. MULTOS™ is a multiple application operating system which runs on IC cards, among other platforms, and allows multiple applications to be executed on the card itself. This allows a card user to run many programs stored in the card (for example, credit/debit, electronic money/purse and/or loyalty applications) irrespective of the type of terminal (i.e., ATM, telephone and/or POS) in which the card is inserted for use.

A conventional single application IC card, such as a telephone card or an electronic cash card, is loaded with a single application when it is manufactured and before it is given to a card user. That application, however, cannot be modified or changed after the card is issued even if the modification is desired by the card user or card issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy and inconvenient.

Therefore, it is beneficial to store multiple applications on the same IC card. For example, a card user may have both a purse application and a credit/debit application on the same card so that the user could select which type of payment (by electronic cash or credit card) to use to make a purchase. Multiple applications could be provided to an IC card if sufficient memory exists and an operating system capable of supporting multiple applications is present on the card. Although multiple applications could be preselected and placed in the memory of the card during its production stage, it would also be beneficial to have the ability to load and delete applications for the card post-production as needed.

It is important, particularly where there is a continuing wide availability of new applications to the cardholder, that the system has the capability of adding applications onto the IC card subsequent to issuance. This is necessary to protect the longevity of the IC cards; otherwise, once an application becomes outdated, the card would be useless. It would be beneficial to allow the addition of applications from a remote location as well as from a direct connection to an application provider's terminal. For example, it would be beneficial for a card user to be able to plug his IC card into his home computer and download an application over the Internet. Alternatively, it would be beneficial for an application provided by Bank A to be loaded from a terminal (such as an ATM) located at Bank B which is connected to Bank A by a network or series of interconnected networks.

The increased flexibility and power of storing multiple applications on a single card create new challenges to be overcome concerning the application loading process in which information (including application code and associated data) is exchanged between the application provider and the individual card. The IC card only has a finite amount of memory on the card for storing applications. Applications and their associated data can vary drastically in size depending upon the application. When multiple applications are stored on a card, and a series of application additions and deletions have occurred, memory fragmentation where memory which is free cannot be used because of size limitations.

Additionally, an IC card has limited space in its input buffer, which can be separate or combined with an output buffer, i.e., an Input/Output (I/O) buffer. It may not be possible to fit the entire application and its associated data into an I/O buffer of an IC card at one time. In order to achieve the flexibility of selectively loading and deleting applications on an IC card, the problems of limited I/O buffer space and fragmentation must be addressed.

Accordingly, it is an object of this invention to provide a system and method that allows for flexible loading of an application and its associated data onto an IC card by segmenting the application and associated data into selected segments in order to limit the size of the data packets being transmitted at one time and reduce fragmentation in the memory of the IC card.

SUMMARY OF THE INVENTION

These and other objectives are achieved by the present invention which provides an IC card system and method for flexibly loading an application and its associated data from an application onto an IC card. The application provider divides the application and its associated data into segments which will fit into the I/O buffer of the intended IC card. Each segment is transmitted separately and the IC card stores the segment in an available space in the IC card's memory. The segments can be placed in non-contiguous memory in order to reduce memory fragmentation. The IC card's microprocessor can additionally determine the smallest memory space which will store the segment in order to minimize fragmentation.

In a preferred embodiment, the application provider determines the size of the IC card's I/O buffer so that it can correctly select the size of each segment.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
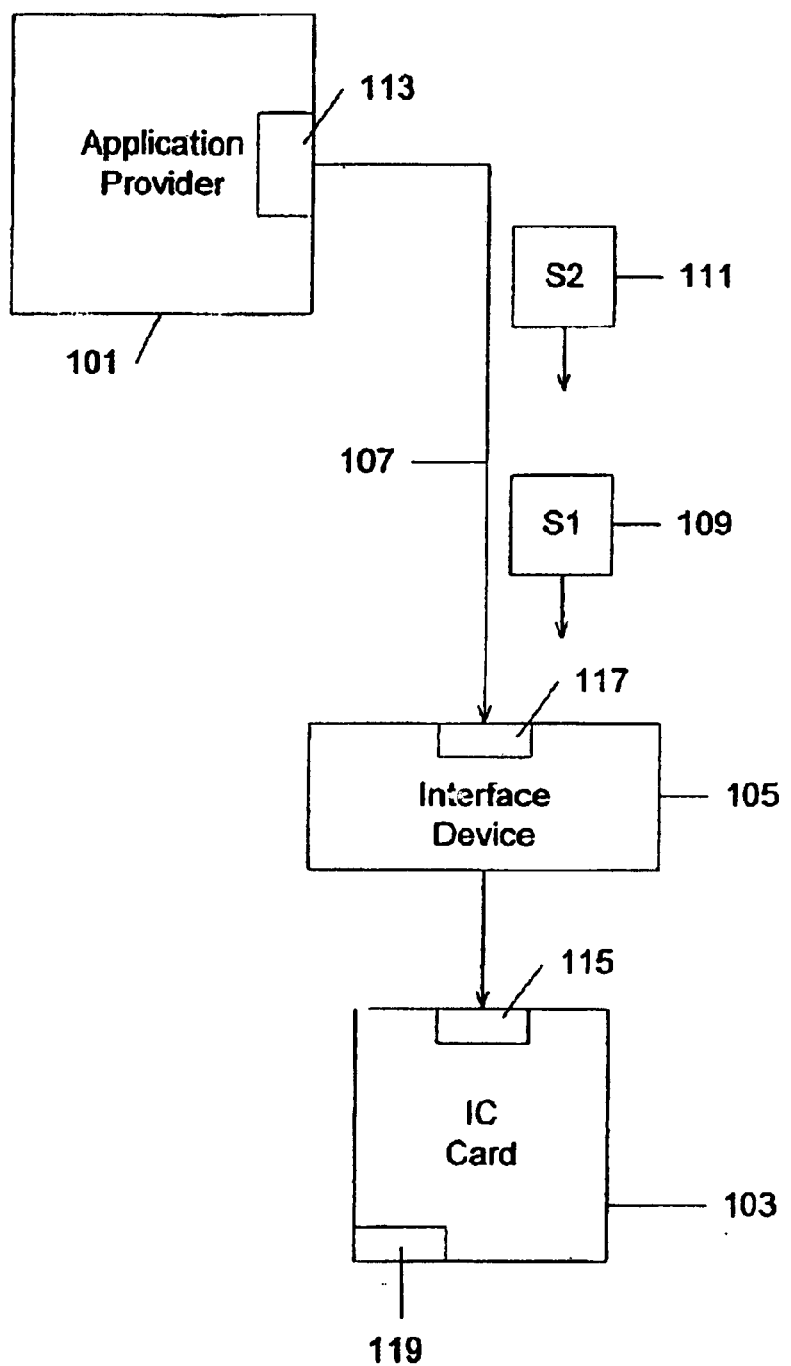
FIG. 1 is block diagram of the flexible loading system of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

It is beneficial to have the capability to load applications onto IC cards containing multiple application operating systems at any time during the lifetime of the IC card. This flexibility allows a user of a card to periodically add new applications to the IC card and also allows older applications to be updated with newer versions of the application when they are released. For example, a card user may start with an IC card that contains a purse, or electronic cash application (e.g., MONDEX™), being stored on her IC card. Some time after the user has the card, she may load an additional application onto the card such as a credit/debit application. Some time after loading the credit/debit application on the card, a new version of the credit/debit application may become available and the card user should be able to erase the old application on her IC card and replace it with the new version of the credit/debit application which may contain additional features.

In a multiple application operating system environment, it is beneficial to be able to load applications both at terminals, such as a bank ATM machine, as well as over remote communication links, such as telephone lines, cable lines, the Internet, satellite or other communications means. When loading applications onto an IC card, the application provider and the card issuer (which could be the same entity) need to provide security regarding the applications to be loaded. The IC card has a limited amount of available I/O space and a limited amount of memory to store applications and their associated data. In order to address these limitations, the application and its associated data is segmented such that each segment will fit in the IC card's I/O buffer at one time. The segment is then stored in the IC card's storage memory, e.g., EEPROM, in a manner that can be non-contiguous to reduce memory fragmentation. This system and technique will now be described in detail.

FIG. 1 shows a block diagram of the entities used in a remote application loading process of an application and its associated data. While FIG. 1 shows a remote loading system, the flexible loading technique also applies to local loading such as a terminal located at the application provider. System 100 includes an application provider for transmitting an IC card application and its associated data to an intended IC card 103, an IC card interface device 105 and a data conduit 107. The application provider 101 can be a card issuer, bank or other entity which provides application loading services. The application provider 101 preferably initiates an application loading process onto IC card 103. Alternatively, the IC card 103 can request the loading process. Application Provider 101 is connected to data conduit 107 which is connected to interface device 105 (e.g., a terminal that communicates with an IC card). Data conduit 107 can be a telephone line, an intranet, the Internet, a satellite link or any other type of communications link. The application provider 101, which is remotely located from the IC card 103 in this example, desires to send and load an application to the IC card. Application provider 101 has an I/O buffer 113 and IC card 103 has an I/O buffer 115. In addition, interface device 105 also contains an I/O buffer 117. Each of the I/O buffers has a maximum storage capacity. The I/O buffers could be a combined input or output buffer or the input buffer and output buffer could be separate. However, the IC card 103 will typically have the smallest I/O buffer due to physical size limitations. The IC card 103 also has a memory 119 in which it stores the loaded application and its associated data.

In the illustrative embodiment of FIG. 1, the application provider 101 sends two application segments S1, 109 and S2, 111 to the interface device 105 which is coupled to IC card 103. The application segments are discussed in more detail in connection with FIG. 4. The application and its associated data are broken into two or more segment units in order for each of the data segments to fit in the I/O buffer of the I/O card. Additionally, the segmentation of the application and associated data helps to reduce fragmentation of the memory of the IC card which stores the application and associated data being loaded.

FIG. 1 shows two segments 109 and 111 which are transferred at discrete times from the application provider to the IC card. However, any number of segments could be used depending upon such factors including the size of the application being loaded, the size of the associated data being loaded, the size of the respective I/O buffers, the availability of memory space on the IC card and the amount of memory fragmentation already on the IC card.

The application could be loaded directly at a terminal and not remotely. In that case, a separate interface device 105 would not be required because the application provider would have its own terminal capable of communicating with the IC card. For example, a bank could load an application onto an IC card by requiring the customer to insert his or her card into the bank's ATM machine. In that case, the application provider communicates with the IC card locally and transmissions are not sent over telephone lines or the Internet. The present invention is applicable to both the remote loading and local loading.

Figure 2:
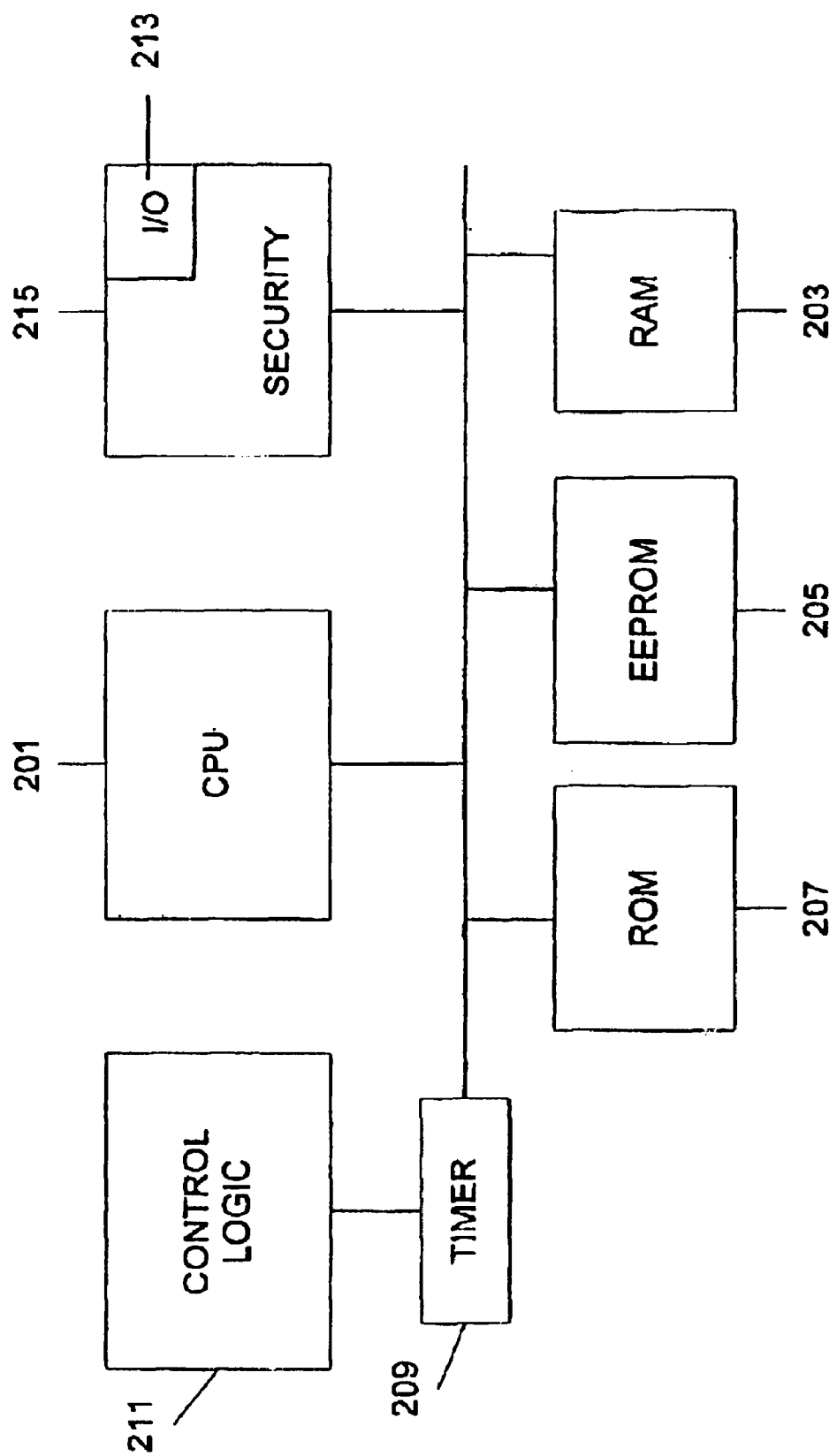
FIG. 2 is a block diagram of an IC card chip upon which an application and its associated data can be flexibly loaded and stored.

FIG. 2 shows an example of a block diagram of an IC card chip upon which an application can be flexibly loaded and stored. An integrated circuit is located on an IC card for use. The IC card preferably includes a central processing unit 201, a RAM 203, an EEPROM 205, a ROM 207, a timer 209, control logic unit 211, an I/O port 213 and security circuitry 215, which are connected together by a conventional data bus.

Control logic 211 in memory cards provides sufficient sequencing and switching to handle read-write access to the card's memory through the input/output ports. CPU 201 with its control logic can perform calculations, access memory locations, modify memory contents, and manage input/output ports. Some cards have a coprocessor for handling complex computations like performing cryptographic operations. Input/output ports 213 are used under the control of a CPU and control logic, for communications between the card and a card interface device. Input/Output ports 213 include an I/O buffer. Timer 209 (which generates or provides a clock pulse) drives the control logic 211 and CPU 201 through the sequence of steps that accomplish memory access, memory reading or writing, processing, and data communication. A timer may be used to provide application features such as call duration. Security circuitry 215 preferably includes fusible links that connect the input/output lines to internal circuitry as required for testing during manufacture, but which are destroyed ("blown") upon completion of testing to prevent later access. The application segments are stored in EEPROM 205. The storage and memory management process as described herein is performed by the CPU 201.

FIG. 2 also shows a possible configuration for the integrated circuit for the application provider. CPU 201 present in the integrated circuit for the application provider determines the size of the IC card's I/O buffer, controls the segmentation of the application and associated data described herein and performs any other necessary operation.

Figure 3:
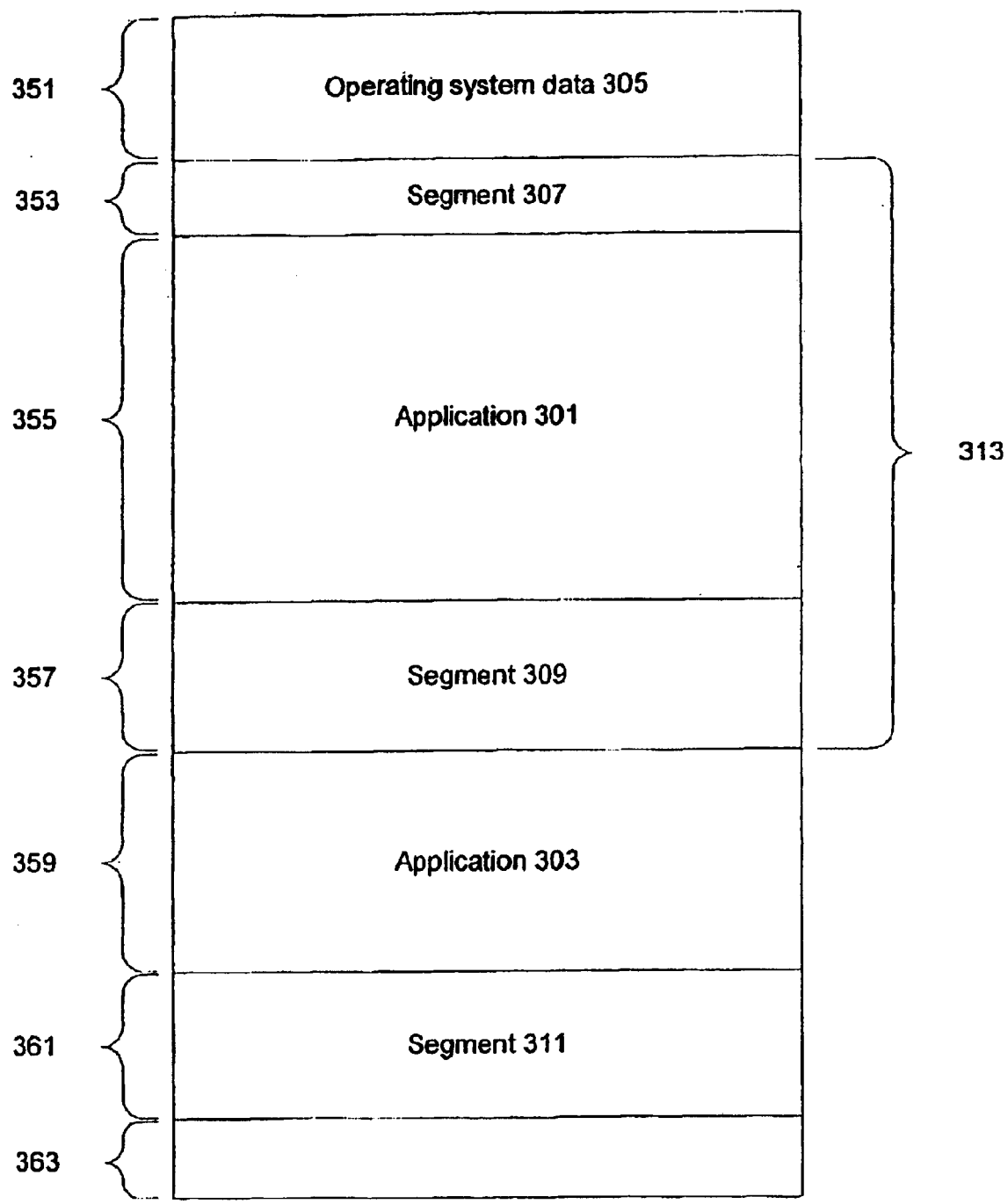
FIG. 3 is a graphic example of a memory map of EEPROM on an IC card.

FIG. 3 shows a graphic representation of a memory map of EEPROM 300 on IC card 103. In this illustrative example, three applications are stored in EEPROM of an IC card. The first application 301 is stored in a contiguous memory space 355. Contiguous memory space means that the application occupies sequential memory addresses with no skipped memory addresses. A second application 303 is stored in contiguous memory space 359. Operating system data required for the execution of the operating system is stored in memory space 351. One example of a cause of fragmentation existing in the IC card is a previous application being deleted which was previously located at memory space 313. The next application loaded onto the IC card after the initial application was deleted can be a different size than the initial application and thus not all the freed up available memory space can be used in such a manner where two or more programs and data are stored contiguously without leaving small portions of unused memory space. In the example of FIG. 1, the last application and its associated data which was loaded was segmented into three segments 307, 309 and 311. These segments are smaller portions of the entire application and its associated data set which could be placed in smaller areas of available memory. Thus fragmentation in the IC card's memory was alleviated by segmenting the application and its associated data.

The operating system stored on the card maintains a record of the physical location of the different segments and can access the physical locations when a logical address is called out when a program or operating system is being executed. The physical address look-up data can be stored in a table, a stack, a pointer or any conventional means for indicating the physical locations. Memory space 363 in FIG. 3 is shown as not storing any data in the example and that memory space could be later used for storing new segmented applications and their associated data.

Figure 4:
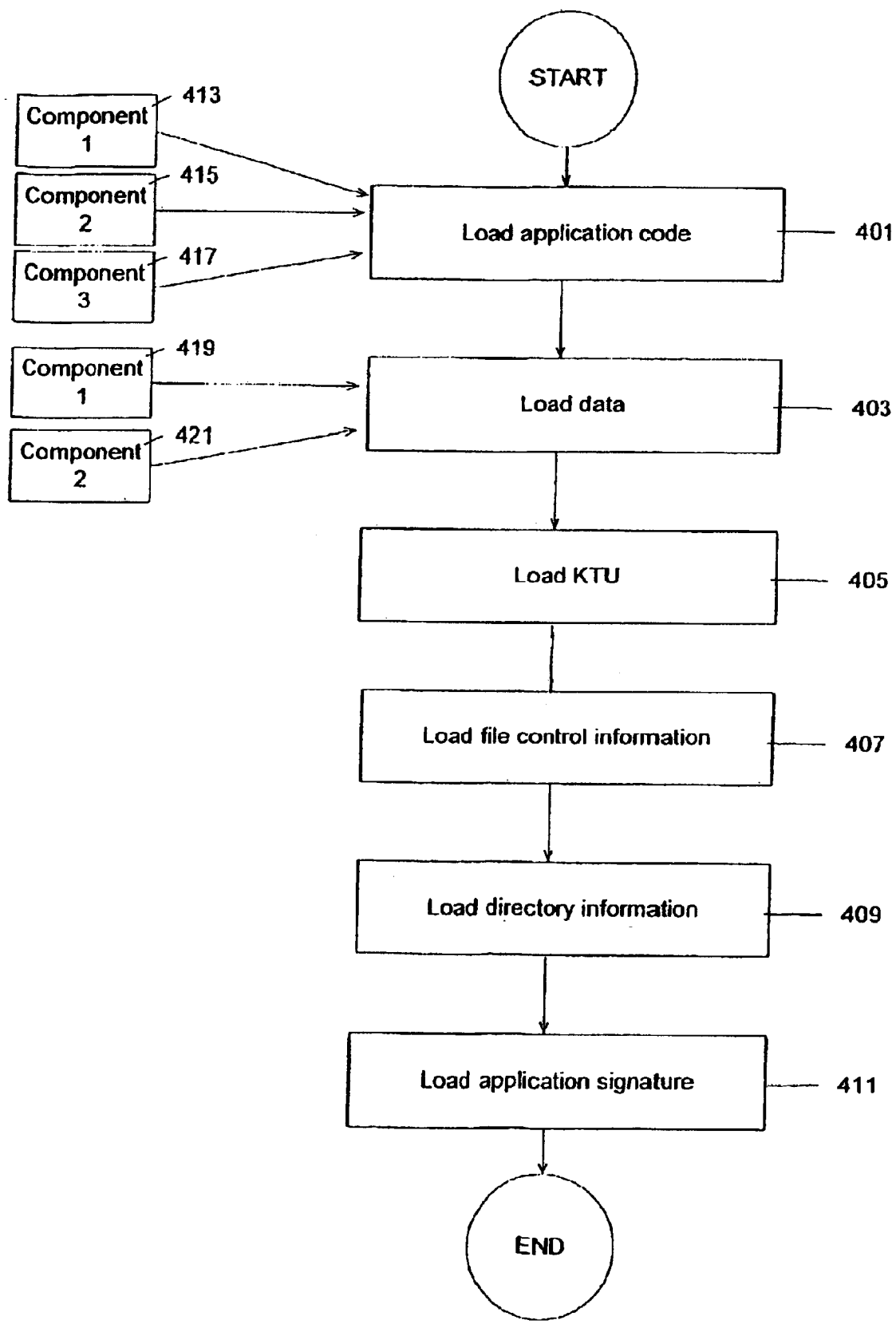
FIG. 4 is a flow chart of an example of multiple segments being loaded onto the IC card.

FIG. 4 shows a flow chart of an illustrative example of loading multiple segments into a memory of an IC card from an application provider. In this example, six initial segments are created to be loaded onto the IC card. Two of the segments are further divided into components which results in a total of nine segments individually being sent to the IC card.

Step 401 loads a segment corresponding to the program code of the application to be provided to the IC card. The program code includes the program instructions which will be executed by the microprocessor located on the IC card. If the code segment is too large to fit into the I/O buffer of either the IC card or the application provider, then the segment can be further split into two or more components which can be separately transmitted to the IC card. In FIG. 4, three components are illustrated for the program code, components 413, 415 and 417. The components are preferably stored in contiguous memory locations in the memory of the IC card. However, the components can be stored in non-contiguous locations if component pointers or tables are supported by the operating system on the IC card.

Step 403 loads the application data segment onto the IC card. The application data segment includes necessary and optional data needed for the execution of the application code. For example, if the application is a credit/debit application, the card user's account number, identification data and credit limit may be needed for the application to run. Another example is a health related application where a customer's medical history may be stored on the card for quick access at remote locations. The medical history data may be quite large and require further segmentation into two or more components. In FIG. 4, components 419 and 421 are shown as subsets of the data segment being loaded in step 403.

Step 405 loads a Key Transformation Unit (KTU) segment for the application being loaded. If the application is being loaded from a remote location, there is a need to make sure the transmission is secure from third party access. The KTU information preferably contains information regarding the encryption key used to encipher the application program and associated data. The key information is sent with the application because applications can be transmitted from any application provider to any IC card with an IC card system. Since different encryption techniques can be used by different application providers, the KTU information is necessary. However, the flexible loading technique also applies when no encryption scheme is used and this information could also be included in another segment depending upon its size.

Step 407 loads a file control segment onto the IC card. File control information preferably includes an application identifier, security information and application and data size requirements. The file control information will be used by the operating system on the IC card to process the application. While in this example the file control information is a separate segment, it could be included in another segment depending upon its size.

Step 409 loads a directory information segment onto the IC card. The directory information preferably includes the name of the application which can be used by the operating system to identify the application. For example, if a select file command is initiated by a terminal, the name of the file to be selected which accompanies the command will be recognized by the operating system on the IC card. If the MONDEX™ Purse is selected by a customer as a terminal, the terminal will send a command to the IC card in the form of a "Select File Mondex" and the IC card will correlate MONDEX with a previously loaded application with the directory name Mondex. While in this example the directory information is a separate segment, the information could be included in another segment depending upon its size.

Step 411 loads an application signature segment onto the IC card. The application signature segment preferably includes data signed with the digital signature of the application provider. This allows the IC card to verify that the application provider is the genuine application provider and not an imposter. The IC card verifies the signature with the public key of an asymmetric encryption key pair of the application provider. While in this example the application signature is a separate segment, the information could be included in another segment if its size permitted it.

The segments could be organized in any manner and sent in any order. The IC card will need to have identified the subject matter of the incoming segment or component so that it can later locate a specific segment or component when needed. This information can be part of the load control information or can be obtained prior to the loading of the application. While FIG. 4 describes a number of different segments, the subject matter of the segments transmitted will vary and depend upon the particular application and associated data.

Figure 5:
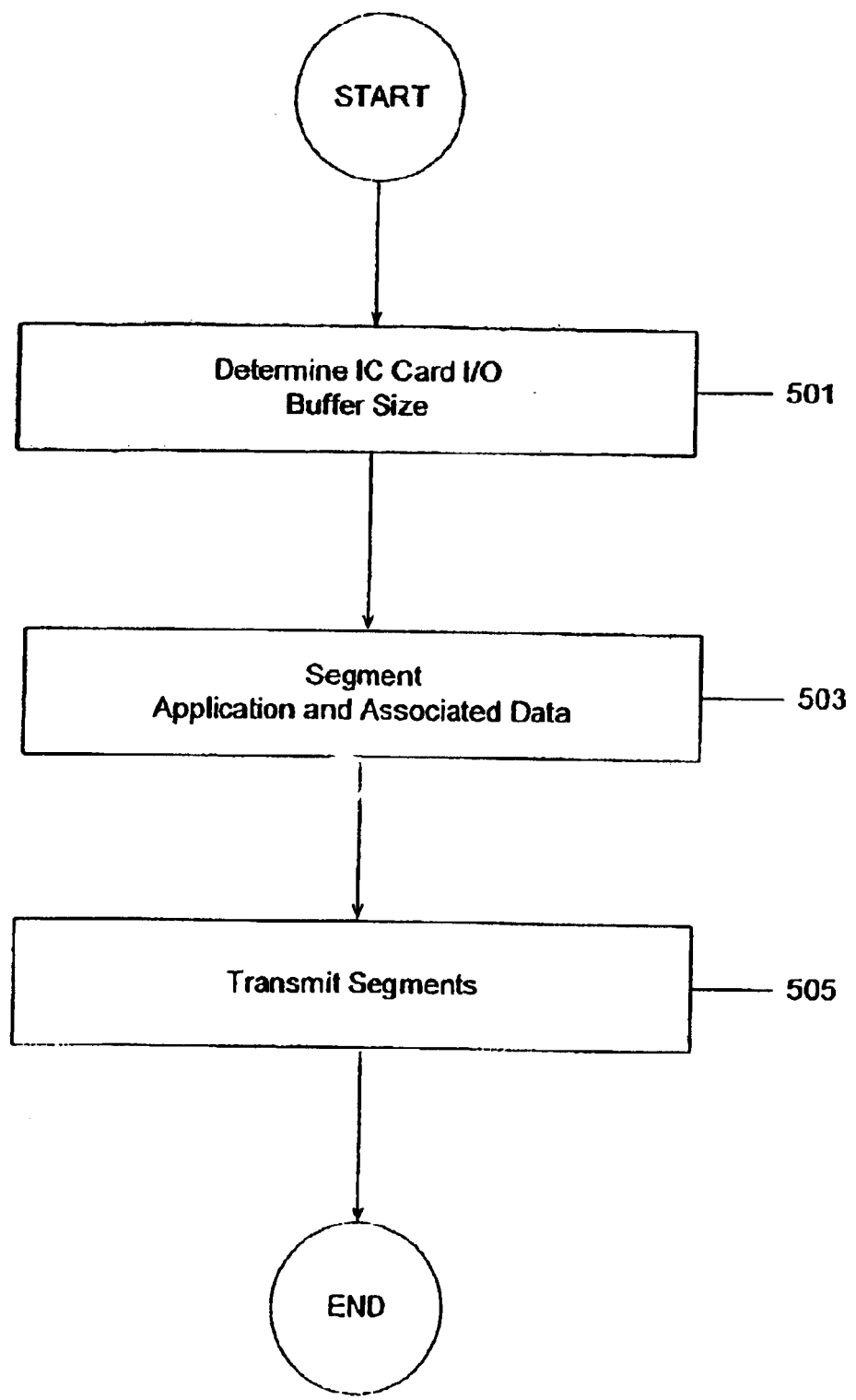
FIG. 5 is a flow chart of the steps of segmenting the application and its associated data by the application provider.

FIG. 5 shows a flowchart of the steps the application provider performs when segmenting the application and associated data to be loaded upon the IC card. Step 501 determines the I/O buffer size of the IC card. Alternatively, the input buffer size is determined if the input and output buffers are separate on the IC card. In most cases, the IC card I/O buffer will be smaller than the application provider I/O buffer because of the limited memory on the IC card. However, if the application provider I/O buffer or the Interface I/O buffer is smaller than the IC card I/O buffer, the smallest I/O buffer will control the size of the segments. The application provider can determine the IC card memory buffer size by some preliminary information exchange which identifies the IC card as the correct card upon which to load the application. Alternatively, some agreement or standard can be followed so that the application provider can create segments which will fit in an IC card which follows the agreement or standard.

Step 503 then segments the application and associated data in two or more segments. In the example of FIG. 4, six initial segments were created and some of the segments were further divided to form two or more components. The segmented information is preferably divided in a predetermined organization to aid the IC card processing of the segments.

Step 505 then sends the segments to the IC card one at a time. When the IC card receives a segment in its I/O buffer, it will store that segment in a location of its memory thus freeing up its I/O buffer for the next incoming segment. After all the segments have been transmitted, the application provider can send a transmission indicating no more segments are being transmitted or the number of segments can be sent at the beginning of the transmission. Alternatively, a known segment protocol can be followed.

Figure 6:
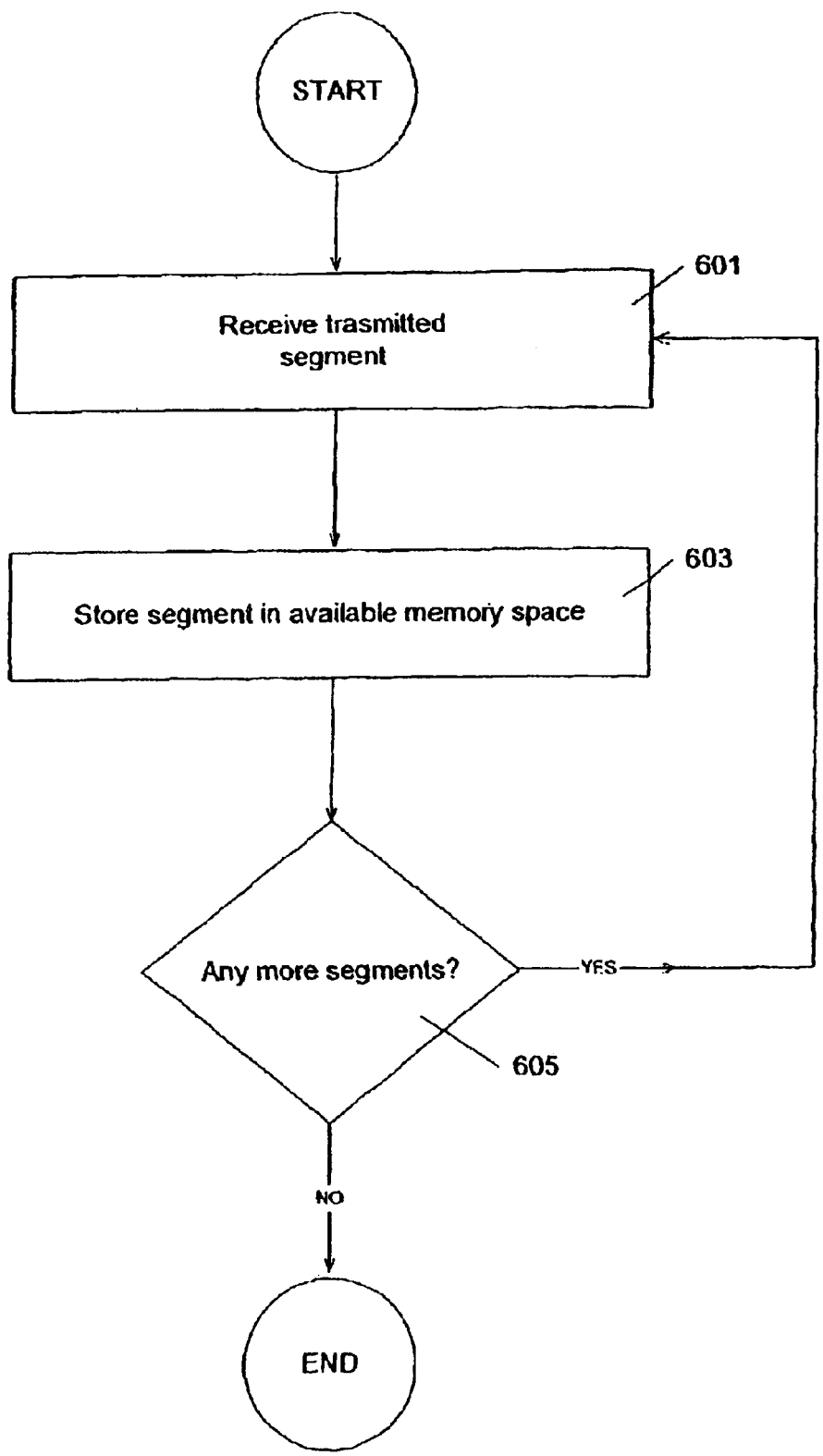
FIG. 6 is a flow chart of the steps of receiving and processing the segmented information by the IC card.

FIG. 6 is a flow chart of the steps of processing the segmented information performed by the IC card. Step 601 receives a transmitted segment in the I/O buffer of the IC card. The entire segment will fit within the I/O buffer because of the processing performed at the application provider. Step 603 then stores the segment in available memory space after the microprocessor on the IC card identifies the proper memory space. The processor can check for the first available free memory space that is sufficient to store the segment. Once the segment is stored at a physical location, that location is recorded either in a segment address table, by a pointer or by any other conventional means. Different memory architectures can be used for storing the segments. For example, all the similar types of segments (e.g., program code) for the stored applications can be stored contiguously if desired. Alternatively, the processor can determine the space that is closest in size to the segment to be stored by scanning the memory. This will reduce any problems of fragmentation in the limited size IC card memory.

Step 605 determines if there are any additional segments to be stored. This step can be accomplished by checking earlier information regarding the number of segments which were being sent. It can also be accomplished by receiving a transmission indicating no more segments. Alternatively, the IC card can simply remain in a wait status until additional data or instructions is sent to the card. If the IC card determines that additional segments are being transmitted, the technique jumps back to step 601. If no more segments, the process ends.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, while loading an application and its associated data is discussed herein, the same flexible loading process can apply to transmitting other types of data such as data blocks, database files, word processing documents or any other type of data requiring to be transmitted in a segmented manner.

We claim:

1. A method for loading an application onto an integrated circuit card subsequent to its issuance the integrated circuit card comprising a memory containing two or more available different-sized spaces each defined by a contiguous memory space of sequential memory addresses with no skipped addresses, said different-sized spaces resulting from content deletions or additions to said memory and including at least one said space having a smallest-sized available area, the method comprising:

dividing the application into a plurality of segments; and for at least one of the plurality of segments, determining which of the one or more available spaces has the smallest-sized available area in the memory in which the at least one of the plurality of segments can be stored.

2. An application loading system for loading an application onto an integrated circuit card subsequent to its issuance, comprising:

an application provider for dividing an application into a plurality of segments; and said integrated circuit card comprising a memory containing two or more available spaces each defined by a continguous memory space of sequential memory addresses with no skipped addresses, said different-sized spaces resulting from content deletions or additions to said memory and including at least one said space having a smallest-sized available area, the integrated circuit card for determining, for at least one of the plurality of segments, which of the one or more available spaces has the smallest available area in the memory in which the at least one of the plurality of segments can be stored.

* * * * *